United States Patent [19]

Krantz

[11] Patent Number: 5,676,034
[45] Date of Patent: Oct. 14, 1997

[54] NEUTRAL CENTERING DEVICE FOR HYDROSTATIC TRANSMISSION

[75] Inventor: William Douglas Krantz, Ft. Wayne, Ind.

[73] Assignee: Dana Corporation, Toledo, Ohio

[21] Appl. No.: 717,231

[22] Filed: Sep. 26, 1996

[51] Int. Cl.[6] ................................................ F01B 1/06
[52] U.S. Cl. ........................... 92/12.1; 74/475; 417/219
[58] Field of Search ............................. 74/475; 91/497; 92/12.1; 417/219

[56] References Cited

U.S. PATENT DOCUMENTS

| 4,958,534 | 9/1990 | Takada et al. | 74/475 |
| 4,968,227 | 11/1990 | Szulczewski et al. | 91/497 |
| 5,182,966 | 2/1993 | von Kaler et al. | 91/497 |
| 5,234,321 | 8/1993 | Gafvert | 417/219 |
| 5,279,206 | 1/1994 | Krantz et al. | 91/497 |

*Primary Examiner*—Thomas E. Denion
*Attorney, Agent, or Firm*—Oldham & Oldham Co., LPA

[57] ABSTRACT

In a hydraulic transaxle, a radial ball piston pump and motor combination receive input torque and translate it into output torque, the direction of which is determined by the position of a cam ring located in the transaxle housing. This cam ring is movable by means of a control shaft which is manually operated. The invention provides an extended control pin linking the control shaft to the cam ring and a channel formed in the transaxle housing. When the control shaft nears a neutral center position, the channel and its rounded edges provide a detented ramp into which the length of a portion of the control pin may be seated. A spring acting on the control shaft urges the control pin into the detented position.

5 Claims, 4 Drawing Sheets

5,676,034

NEUTRAL CENTERING DEVICE FOR HYDROSTATIC TRANSMISSION

The present invention relates to an improvement for a hydrostatic transmission, especially a hydrostatic transmission as used in a motor vehicle, such as a lawn tractor or the like. More particularly, the present invention relates to a device for centering the neutral gear position in the hydrostatic transmission, to permit easier return of the control shaft to the "neutral" position by an operator of the vehicle employing the transmission.

BACKGROUND OF THE ART

The use of hydrostatic transmissions in relatively small lawn and garden tractors is well known. One example of a vehicle which has used a prior art hydrostatic transmission is a mid-mount lawn tractor having an engine, front and rear wheels and a working implement or lawn mower mounted between the front and rear wheels. In the past, operators of such vehicles have encountered difficulty in putting the transmission of the vehicle into a true "neutral" position when the vehicle is in either a "forward" or "reverse", since the ability to put the transmission into the neutral position really involves putting a rotary fluid pressure pump contained within the transmission into a neutral position, and this further involves the rotation of a manual control shaft, which controls the position of the cam ring of the pump element. Since a small rotation of the control shaft may result in a relatively large movement of the cam ring, precise location of the neutral point may be difficult.

SUMMARY OF THE INVENTION

It is, therefore, an object of the present invention to provide a neutral centering device for a hydrostatic transmission which enables the operator to easily and precisely center the transmission in a neutral condition. Such a device is provided by a neutral centering device for a hydraulic transaxle assembly contained in a housing having a first cover member and a second cover member. The transaxle assembly includes a cam ring disposed between the cover members so that the cam ring is rotatable between first and second displaced positions with a neutral position therebetween, the cam ring being angularly displaceable about a pivot pin in response to rotation of a control shaft. The hydraulic transaxle therefore translates input torque into output torque in a first direction when the control shaft is in a first angular position corresponding to when the cam ring is in the first displaced position, into output torque in an opposite second direction when the control shaft is in a second angular position corresponding to when the cam ring is in the second displaced position and into no output torque when the control shaft is in the neutral centering position corresponding to when the cam ring is in the neutral position. The neutral centering device comprises a control pin, a channel formed in the first housing member for providing a detented seat for a portion of the control pin when the control shaft is aligned in the neutral position, and a spring or other biasing means for urging the control pin portion into the detented seat. The control pin has a first portion and a second portion and passes radially through the control shaft so that each of said portions extend radially outwardly from the control shaft inside the housing. The first portion has a distal end adapted for connection to the cam ring.

Other advantages and novel features of the present invention will become apparent in the following detailed description of the invention when considered in conjunction with the accompanying drawings.

BRIEF DESCRIPTION OF THE DRAWINGS

In the accompanying drawings in which identical parts are identified with identical reference numerals.

DETAILED DESCRIPTION OF THE DRAWINGS

Figure 1:
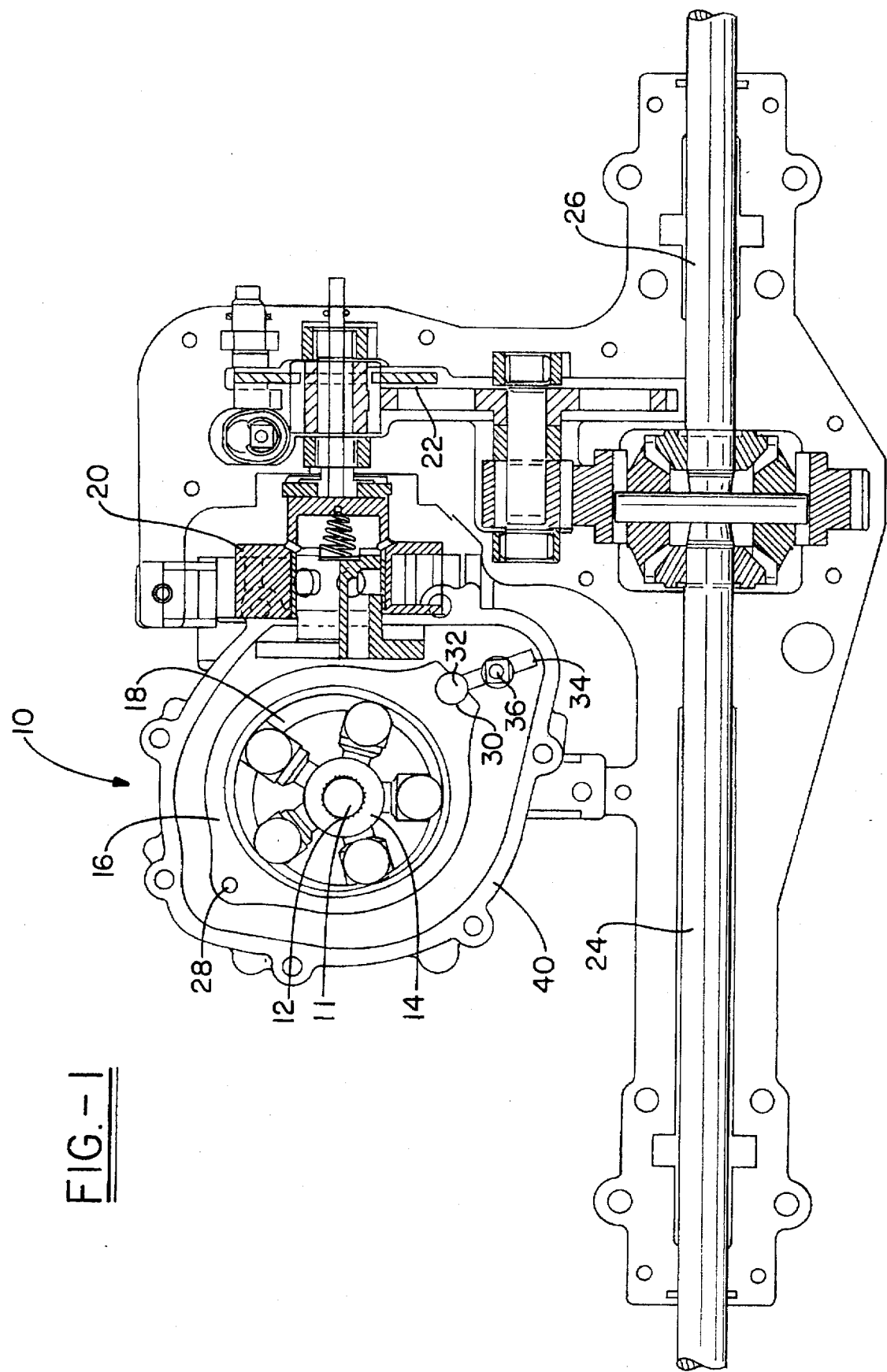
FIG. 1 shows a top plan view in partial section of a hydrostatic transmission for a vehicle incorporating the improved centering device of the present invention, with the transmission set in a first "full stroke" position.
Figure 2:
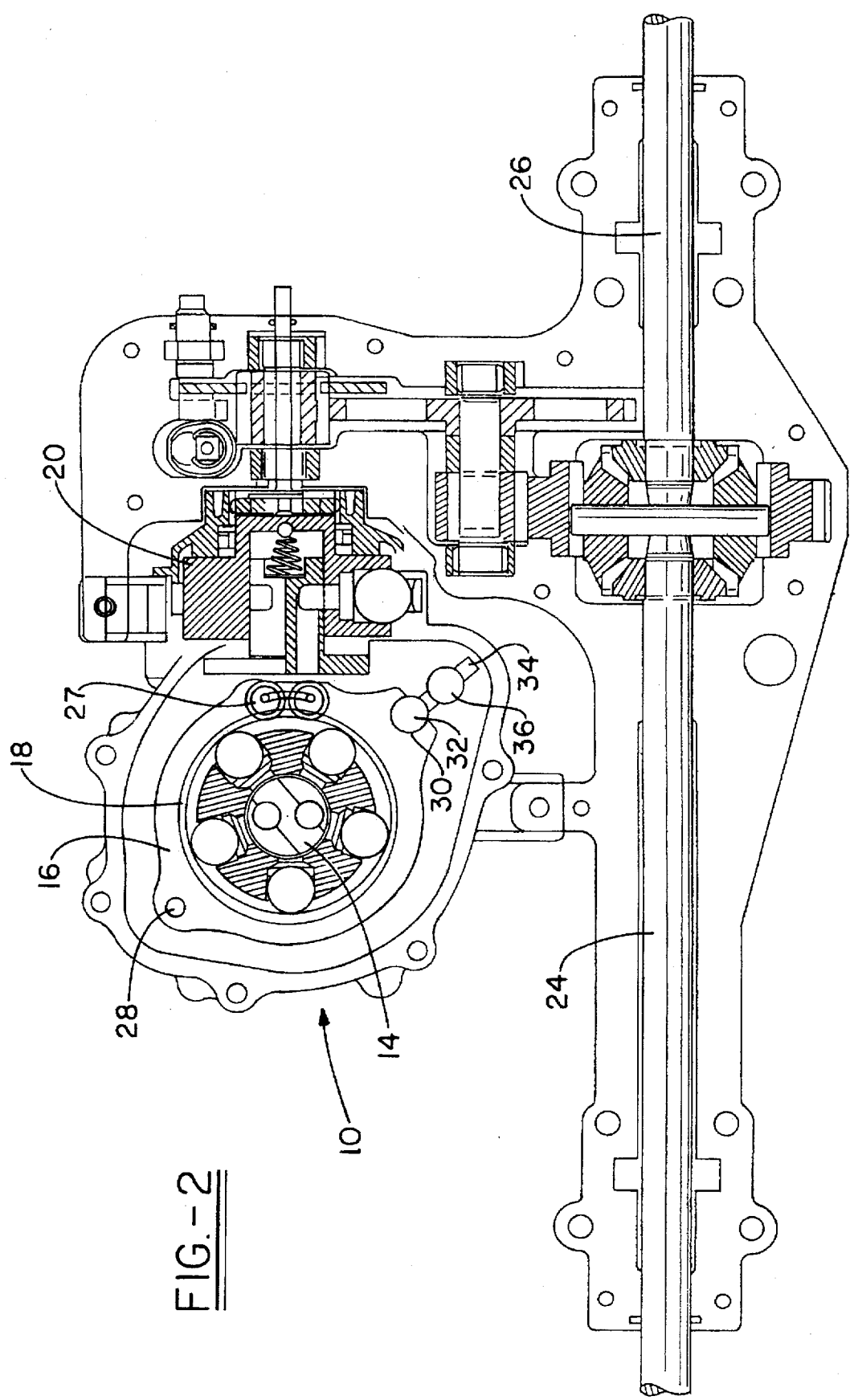
FIG. 2 shows a top plan view in partial section of a similar transmission with the transmission set in a "neutral" position.

In the following detailed description of the preferred embodiment of the present invention, reference is made to the accompanying drawings which, in conjunction with this detailed description, illustrate and describe a preferred embodiment of a neutral centering device for a motor vehicle hydrostatic transmission. Refer now to FIG. 1, which illustrates a top view, partly in cross-section and partly in plan view, of a motor vehicle hydrostatic transmission, generally identified by reference numeral 10, for a transaxle in accordance with a preferred embodiment of the present invention. Described in very general terms, input torque from an engine (not shown), typically a gasoline engine, enters the transmission 10 from a pulley through an input shaft 11 positioned essentially normal to and above the paper as shown in FIG. 1. The input shaft 11 is mechanically coupled by a spline to a key 12 on a pump rotor 14 of a radial ball piston motor as is known in the prior art. The entry of drive torque from the engine causes pump rotor 14 to rotate in the same direction as the input shaft 11, which always rotates in a single direction. However, the position of a cam ring 16 and a pump race 18 relative to the pump rotor 14 determine the direction of flow of hydraulic fluid within channels provided in the transmission 10. In a first eccentric position of the cam ring 16 relative to the axis of input shaft 11, hydraulic fluid flow causes motor rotor 20 to rotate in a direction which, when translated through a gear set 22 to driven axles 24, 26 provides a "forward" direction of motion in the driven axles. Such a first eccentric position is shown in FIG. 1. In a second eccentric position of the cam ring 16 relative to input shaft 11, hydraulic fluid flow causes motor rotor 20 to rotate in the opposite direction which, when translated through the gear set 22 to the driven axles 24, 26 provides a "reverse" direction of motion in the driven axles. This second "full stroke" eccentric position is not specifically illustrated, but, if shown, it would present a leftward shift of the cam ring 16 essentially mirroring the rightward shift illustrated in FIG. 1. Between the first and second eccentric or "full stroke" positions, there is a neutral or centered position in which the cam ring 16 is centered about the axis of the input shaft 11 and hydraulic fluid does not cause motor rotor 20 to rotate at all, thereby providing a neutral condition to the driven axles 24, 26. This "neutral" position is shown in top plan view in FIG. 2. The present invention is particularly useful when the transmission 10 also has a wide-band neutral feature 27 as shown in FIG. 2. Such a feature is described in more detail in U.S. Pat. No. 4,968,227, issued to Szulczewski.

The cam ring 16 is able to make these movements since it is disposed about a pivot pin 28 located on one end of the cam ring. Diametrically opposed to the pivot pin 28 is a hole 30 for receiving a generally cylindrical cam ring insert 32. This cam ring insert is at one end of a control pin 34 linking the cam ring insert 32 to a control shaft 36. When control shaft 36 is rotated about its axis, the linkage to the cam ring insert 32 causes the cam ring 16 to rotate about the pivot pin 28, with a range of motion from the first eccentric position to the second eccentric position possible, as described above. It will be recognized that the control shaft 36 therefore effectively controls the direction of motion of the driven axles 24, 26. Typically, the control shaft is movable about 19° on either side of the centered position to the respective "full stroke" eccentric positions.

Figure 3:
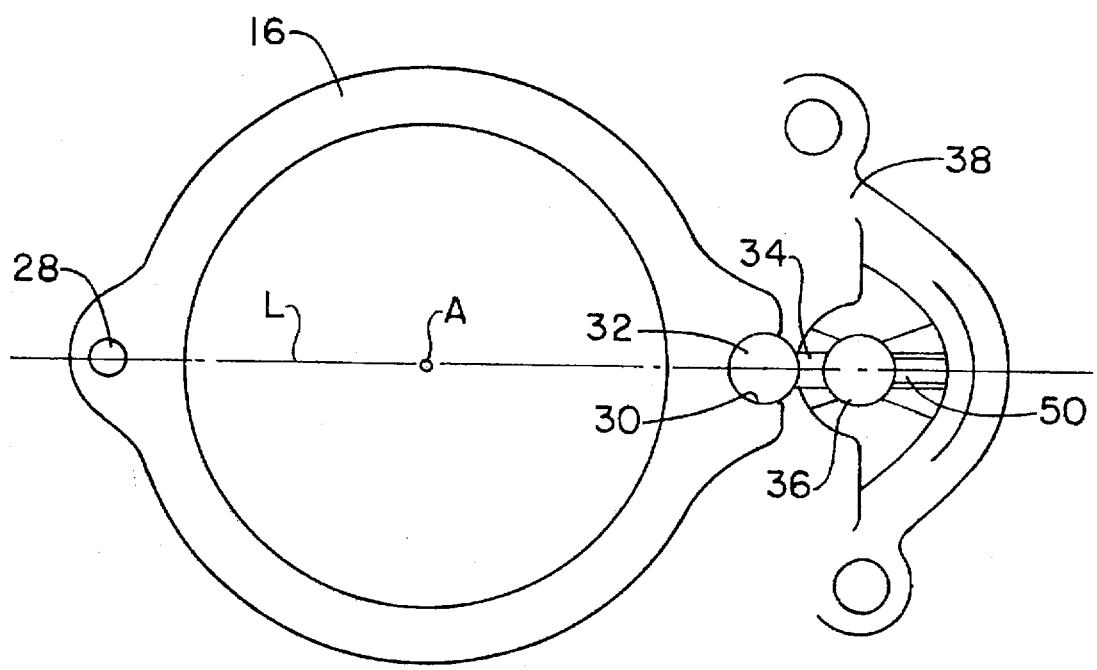
FIG. 3 shows a schematic bottom view of the cam ring and cam ring control elements with the cam ring in a neutral position of FIG. 2.
Figure 4:
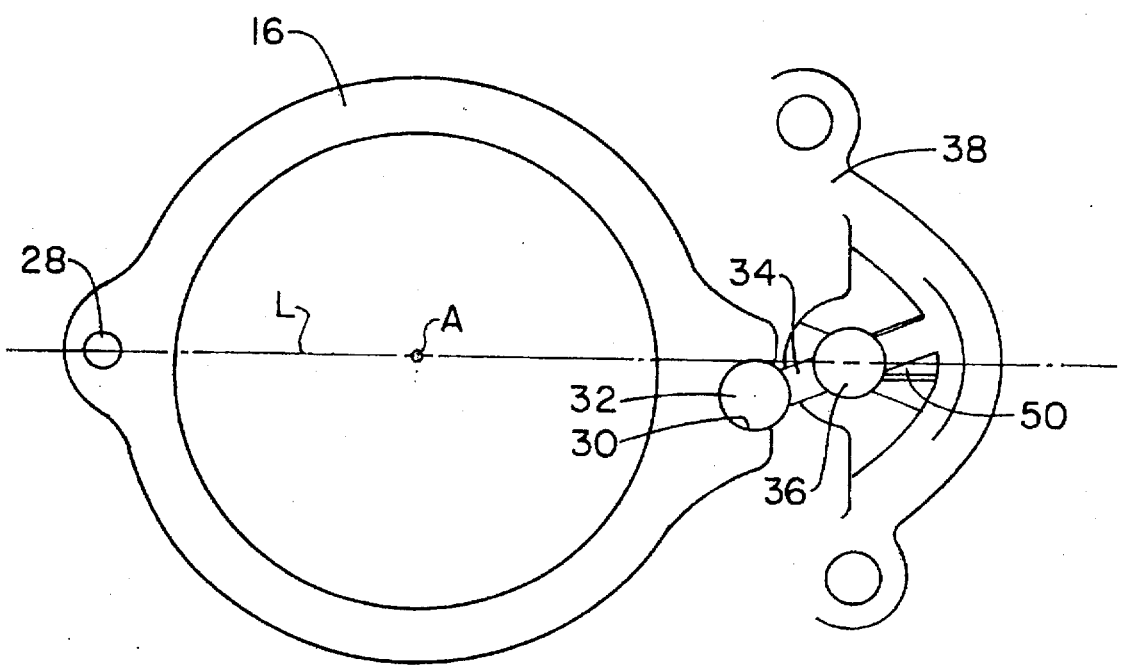
FIG. 4 shows a schematic bottom view of the cam ring and cam ring control elements with the cam ring in the "full stroke" position of FIG. 1.

A fuller understanding of the present invention will be had by reference to FIGS. 3 and 4, where further aspects of the present invention are disclosed in a bottom view schematic fashion to emphasize the important elements thereof. Specifically, FIGS. 3 and 4 show the cam ring 16, pivot pin 28 and the cam ring control elements, namely, the cam ring hole 30, the cam ring insert 32, the control pin 34 and the control shaft 36. Pump rotor 14 is not shown in these Figures, but the axis A shared by the pump rotor and the coaxial input shaft 11 is shown as a point of reference. FIG. 3 corresponds to the neutral position shown in FIG. 2 and FIG. 4 corresponds to the full stroke position of FIG. 1. FIG. 1, for example, shows cam ring 16 shifted leftwardly from a straight line defined by the axis of pivot pin 28, the axis of pump rotor 14 and the axis of control shaft 36, when viewed from pivot pin, as exemplified by the leftwardly-shifted position of cam ring insert 32. This represents a first full stroke or eccentric position as described above. FIG. 3 shows cam ring 16 neutrally positioned along the same straight line, designated as L, with A representing the pump rotor axis. This is the neutral position described above. FIGS. 3 and 4 also show a partial view of an input cover 38, through which control shaft 36 passes and which covers cam ring 16 and holds cam ring in place when the input cover is secured to the flanged housing 40 which is shown in FIG. 1, but not in FIGS. 3 and 4.

Figure 5:
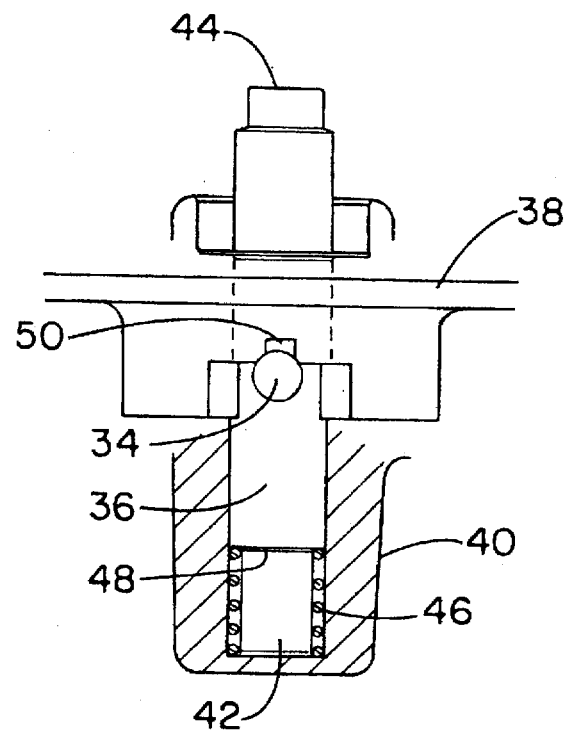
FIG. 5 shows an end view of the cam ring control elements in the neutral position of FIG. 2.
Figure 6:
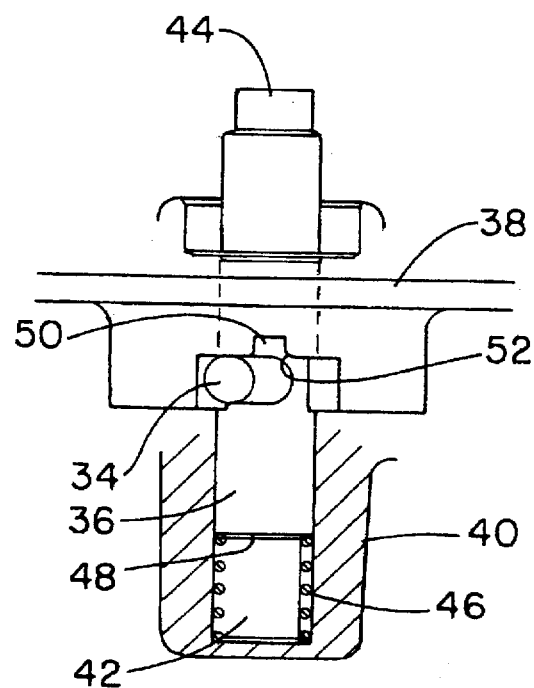
FIG. 6 shows an end view of the cam ring control elements in the full stroke position as in FIG. 1.

Attention is now directed to FIGS. 5 and 6, each of which shows a sectional side view of the details of the cam ring control elements. Particularly, FIG. 5 shows the present invention when the cam ring 16 is in the neutral position of FIG. 2 or 3; FIG. 6 shows the present invention when the cam ring is in the leftwardly-shifted full stroke position of FIG. 1 or 4. Although the rightwardly-shifted second full stroke position of the cam ring is not specifically illustrated, it will be understood to be merely the mirror image of FIG. 6. As seen in FIGS. 5 and 6, the input cover 38 and flanged housing 40 may be secured to each other to provide a cylindrical hole 42 in which control shaft 36 may be seated such that one end 44 of the control shaft extends out of the housing, from whence the control shaft may be operated by a user of the vehicle in which the transmission is installed. At the end of hole 42 provided by flanged housing 40, a means for biasing, exemplified by a helical spring 46 in FIGS. 5 and 6, acts upwardly on the second end 48 of the control shaft 36. Control shaft has control pin 34 passing therethrough. The upward biasing force provide by the biasing means 46 causes the control pin 34 to bear against the inner surface of the input cover. Formed into the inner surface of the input cover, preferably machined into that inner surface, is a downwardly-open channel 50. This channel has a width somewhat smaller than the diameter of the control pin 34, so that the control shaft 36 detents slightly as the control pin is moved into alignment with the channel. As best shown in FIG. 6, the side edges 52 of the channel are preferably rounded to facilitate the movement of the control shaft in and out of the detented position. Referring to FIGS. 3 and 4, it is seen that the channel 50 is preferably formed on the inner surface of the input cover so that it acts on a portion of the control pin which extends beyond control shaft 36, rather than acting on the portion of the control pin located between the control shaft and the cam ring insert 32.

The particular advantage presented by the present invention is that it provides a positive method of aligning the extended end of the control pin along the centering channel, thereby providing a positive feel for the neutral position, instead of a "search and find" neutral as has been provide in the prior art. Because the manufacturing tolerances of the centering channel and the assembly tolerances inherent in assembling the transmission may result in some slight misalignment of the points to be aligned, the present invention works best when the transmission also has a "wide band neutral" or some sort of neutral flow bypass valve incorporated therein. The "wide band neutral" feature is known in the prior art, and an improved version thereof is described in U.S. Pat. No. 4,968,227, issued to Szulczewski. This wide band neutral works with the neutral centering device to prevent vehicle creep due to manufacturing tolerances in the neutral centering device.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A neutral centering device for a hydraulic transaxle assembly contained in a housing having a first cover member and a second cover member, the transaxle assembly including a cam ring disposed between the cover members and rotatable between first and second displaced positions with a neutral position therebetween, the cam ring being angularly displaceable about a pivot pin in response to rotation of a control shaft, such that the hydraulic transaxle translates input torque into output torque in a first direction when the control shaft is in a first angular position corresponding to when the cam ring is in the first displaced position, into output torque in an opposite second direction when the control shaft is in a second angular position corresponding to when the cam ring is in the second displaced position and into no output torque when the control shaft is in the neutral centering position corresponding to when the cam ring is in the neutral position, said device comprising:

a control pin having a first portion and a second portion, the control pin passing radially through the control shaft so that each of said portions extend radially outwardly from the control shaft inside the housing, the first portion having a distal end adapted for connection to the cam ring;

a channel formed on an inner surface of the first cover member, said channel positioned thereon such that the channel provides a detented seat for the second portion of the control pin when the control shaft and cam ring are aligned in the neutral position; and a spring bearing on an end of the control shaft to urge the second portion of the control pin against the inner surface having the channel formed thereon.

2. The neutral centering device of claim 1 wherein the channel has a width that is smaller than the diameter of the control pin.

3. The neutral centering device of claim 1 wherein the channel has rounded side edges.

4. The neutral centering device of claim 1 wherein the spring urges the control shaft outwardly from the housing such that the biasing force thereof may be overcome by external pressure on an external end of the control shaft.

5. The neutral centering device of claim 1 wherein the channel has a longitudinal axis aligned with a line defined by the pivot pin of the cam ring and the control shaft.

* * * * *